(12) United States Patent
Kombowski

(10) Patent No.: US 8,186,491 B2
(45) Date of Patent: May 29, 2012

(54) TORQUE TRANSMISSION DEVICE

(75) Inventor: Eugen Kombowski, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 811 days.

(21) Appl. No.: 12/287,940

(22) Filed: Oct. 15, 2008

(65) Prior Publication Data

US 2009/0095590 A1 Apr. 16, 2009

(30) Foreign Application Priority Data

Oct. 15, 2007 (DE) .................... 10 2007 049 274

(51) Int. Cl.
*F16H 45/02* (2006.01)
(52) U.S. Cl. ........................................ 192/3.29
(58) Field of Classification Search ............. 192/3.29, 192/70.18
See application file for complete search history.

(56) References Cited

U.S. PATENT DOCUMENTS

| | | | | |
|---|---|---|---|---|
| 5,662,194 A * | 9/1997 | Jackel | | 192/3.29 |
| 5,826,688 A * | 10/1998 | Arhab et al. | | 192/3.29 |
| 6,123,177 A * | 9/2000 | Arhab | | 192/3.29 |
| 6,193,036 B1 * | 2/2001 | Arhab et al. | | 192/3.29 |
| 6,280,333 B1 * | 8/2001 | Thevenon | | 192/3.29 |
| 6,378,676 B1 * | 4/2002 | Chasseguet et al. | | 192/3.29 |
| 6,390,263 B1 * | 5/2002 | Arhab | | 192/3.29 |
| 6,675,941 B1 * | 1/2004 | Arhab et al. | | 192/3.29 |
| 6,837,347 B2 * | 1/2005 | Tomiyama | | 192/3.29 |
| 6,938,744 B2 * | 9/2005 | Tomiyama | | 192/3.29 |
| 2003/0029685 A1 * | 2/2003 | Bauer et al. | | 192/3.29 |

* cited by examiner

*Primary Examiner* — Greg Binda
*Assistant Examiner* — Josh Skroupa
(74) *Attorney, Agent, or Firm* — Simpson & Simpson, PLLC

(57) ABSTRACT

The invention is a torque transmission device, in particular in the power train of a motor vehicle, having a hydrodynamic torque converter that includes a converter cover connected with a drive unit. The torque transmission device is connectable via an impeller with a turbine wheel. The connection with the turbine wheel can be bypassed by means of a torque converter clutch. The clutch comprises a piston, which relative to the converter cover, is displaceable axially restrictedly. The invention is characterized in that pins are fixed on the piston; the pins extend in the axial direction and serve for splined connection of the piston with the converter cover.

5 Claims, 4 Drawing Sheets

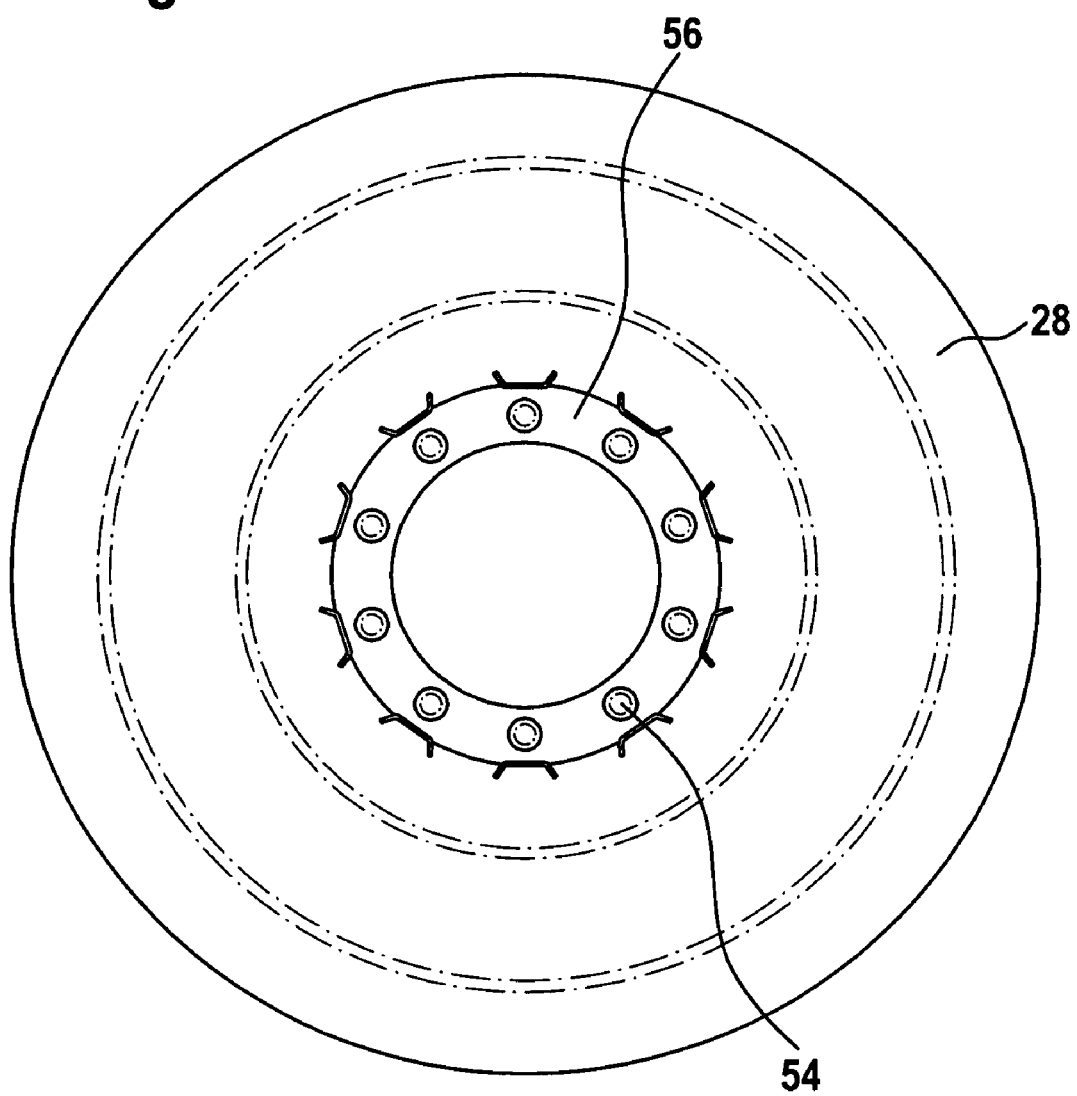

TORQUE TRANSMISSION DEVICE

CROSS REFERENCE TO RELATED APPLICATIONS

This patent application claims priority of German Patent Application No. 10 2007 049 274.1, filed Oct. 15, 2007, which application is incorporated herein by reference.

FIELD OF THE INVENTION

The invention relates to a torque transmission device, particularly, in the power train of a motor vehicle, having a hydrodynamic torque converter that comprises a converter cover connectable or rather connected with a drive unit that is connectable via an impeller with a turbine wheel, which can be bypassed by means of a torque converter clutch, which comprises a piston, which is displaceable relative to the converter cover although axially restricted.

BRIEF SUMMARY OF THE INVENTION

The object of the invention is to improve the connection of the piston of the torque converter clutch to the converter cover for a torque transmission device.

The object is met with a torque transmission device, particularly, in the power train of a motor vehicle, with a hydrodynamic torque converter that comprises a converter cover connectable or rather connected with a drive unit that is connectable via an impeller with a turbine wheel that can be bypassed by means of a torque converter clutch, which comprises a piston that is displaceable relative to the converter cover although axially restricted, in that, pins are fixed on the piston, said pins extend in the axial direction and serve for splined connection of the piston to the converter cover. "Axial" in this context means that the pins extend parallel to the axis of rotation of the torque transmission device or of converter cover or of piston, so that motion of piston is enabled in the axial direction, wherein the pins simultaneously transmit at least a part of drive torque.

A preferred embodiment of the torque transmission device comprises in that pins for a splined connection of the piston with the converter cover engage in holes provided in a coupling element that is fixed on the converter cover. The design and size of the holes are adapted to the design and size of the pins. The coupling element is preferably executed as a coupling plate.

A further preferred embodiment of the torque transmission device includes pins for splined connection of the piston with the converter cover that engage in holes or depressions that are provided in the converter cover. In this embodiment, no coupling element is required.

According to a further embodiment, the pins that extend in the axial direction and serve for splined connection of converter cover with the piston can also be fixed on the converter cover. "Axial" in this context means that the pins extend parallel to the axis of rotation of the torque transmission device or rather of converter cover or rather of piston, so that the motion of piston is enabled in the axial direction, wherein the pins simultaneously transmit at least a part of the drive torque.

In a further preferred embodiment of the torque transmission device, the pins for splined connection of the converter cover with the piston engage in holes provided in a coupling element that is fixed on the piston. The design and size of the holes are adapted to the design and size of the pins. The coupling element is preferably executed as a coupling plate.

A further preferred embodiment of the torque transmission device includes pins for the splined connection of the converter cover with the piston that are engaged with holes that are provided in the piston. In this embodiment, no coupling element is required.

A further preferred embodiment of the torque transmission device is provided in which the piston is pressed against the converter cover by means of a spring element in the circumferential direction. The spring element is preferably formed as spring steel sheet.

A further preferred embodiment of the torque transmission device in which the spring element engages with the holes with which the pins also engage. In this embodiment, no coupling element is required.

A further preferred embodiment of the torque transmission device is provided in which the spring element features driving tongues that engage with the cutouts provided on the coupling element. Preferably the driving tongues and the cutouts uniformly are distributed and assigned to one another respectively in the circumferential direction.

A further preferred embodiment of the torque transmission device is provided wherein the pins are riveted on the piston or converter cover. Alternatively, the pins can also be welded or screwed. The pins can also be executed as a single piece with the piston or the converter cover.

BRIEF DESCRIPTION OF THE SEVERAL VIEWS OF THE DRAWING

Further advantages, features and details of the invention result from the following description, in which, with reference to the drawing, different exemplary embodiments are described in detail. The figures are as follows:

FIG. 6 shows the spring element from FIG. 4, as it is fixed on a piston of a torque converter clutch.

DETAILED DESCRIPTION OF THE INVENTION

Figure 1:
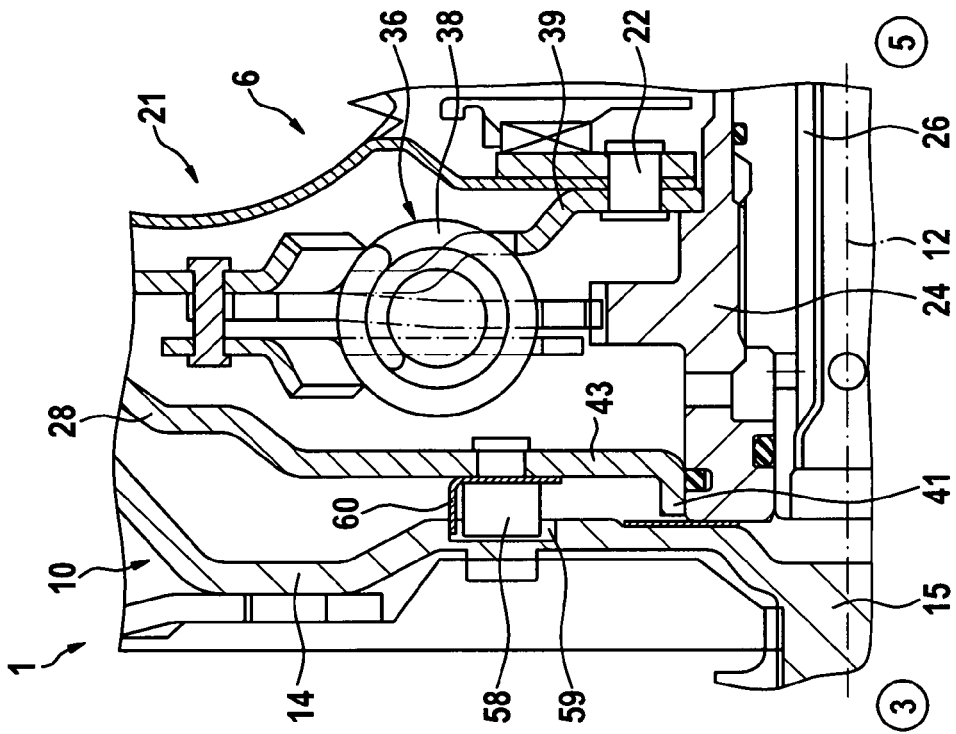
FIG. 1 shows a first embodiment of a torque transmission device in the power train of a motor vehicle in half section.
Figure 2:
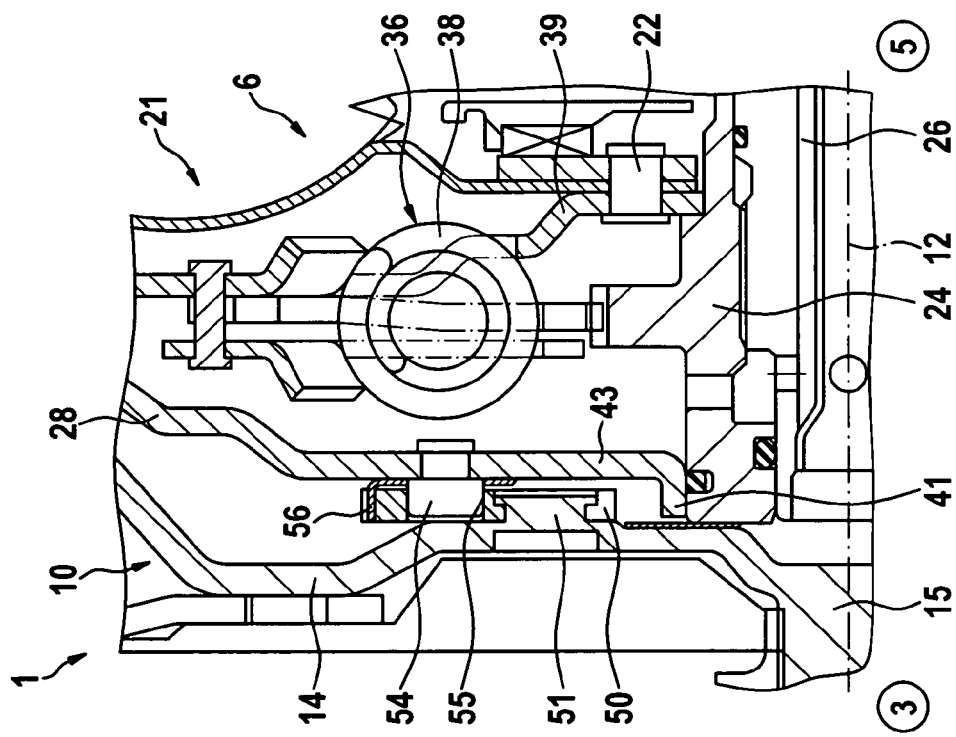
FIG. 2 shows a second embodiment of a torque transmission device in the power train of a motor vehicle in half section.

In FIGS. 1 and 2, a part of a power train of a motor vehicle is respectively depicted in half section with torque transmission device 1 according to the invention. Hydrodynamic torque converter 6 is disposed between drive unit 3 (only outlined), particularly of an internal combustion engine, from which a crankshaft proceeds and transmission 5 (likewise only outlined). The crankshaft of drive unit 3 is, for instance, connected rigidly with a housing 10 of torque converter 6 by means of a drive plate that is also designated as flex plate.

Housing 10 of torque converter 6 is rotatable about axis of rotation 12 and equipped with housing wall 14 adjacent to the drive, housing 10 is also designated as converter cover 14. Central pilot journal pin 15 is fixed on converter cover 14, which serves initially to centralize hydrodynamic torque converter 6 during assembly in a central recess of the crankshaft.

Hydrodynamic torque converter 6 comprises a stator, an impeller and turbine wheel 21. Turbine wheel 21 is fixed radially inside by means of rivet fastening elements 22 and a further part on hub 24. Hub 24 is connected, for instance, via appropriate splines with transmission input shaft 26 in a rigid manner. During operation of hydrodynamic torque converter 6, kinetic energy of oil flow is converted into rotary force. At the same time, turbine wheel 21 imparts the kinetic energy via hub 24 to transmission input shaft 26. The stator is provided with overrunning means and guides the oil flow to the impeller, at a convenient angle.

In the axial direction piston 28 of a torque converter clutch between is disposed converter cover 14 and turbine wheel 21. In the closed state, the torque converter clutch establishes mechanical connection between the impeller and turbine wheel 21. The torque converter clutch comprises friction linings that are fixed on an output part of torsional vibration damper 36. The output part of torsional vibration damper 36 is coupled with input part 39 by means of interposed spring elements 38. Input part 39 of torsional vibration damper 36 is fixed on turbine wheel 21 by means of rivet fastening elements 22 and, for instance, by means of form-closure on hub 24.

Piston 28 of the torque converter clutch features radially internally collar 41 extending in axial direction, through which piston 28 is guided in a displaceable manner in the axial direction on hub 24. From collar 41, connection disk 43 of piston 28 extends radially outwards. Piston 28 is hydraulically actuated such that it moves in axial direction towards converter cover 14 in order to close the torque converter clutch.

In the embodiment depicted in FIG. 1, coupling element 50 is fixed on converter cover 14, with the help of rivet warts 51, which are pressed out of converter cover 14. Rivet warts 51 engage with holes or rather with blind holes that are cutout in coupling element 50. Coupling element 50 is preferably made of sheet metal and is designated as intermediate sheet metal. Radially outside rivet warts 51, coupling element 50 features cutouts 55 that extend in the axial direction.

"Axial" in this context means parallel to axis of rotation 12. Pin 54 riveted on piston 28 engages respectively with cutouts 55. Pins 54 engage preferably positively with corresponding cutouts 55, in order to establish a splined connection between piston 28 and converter cover 14. At the same time the embodiment of pins 54 and cutouts 55 enable a motion of piston 28 in the axial direction, when it is activated.

To prevent rattle noises while the torque converter clutch is open is piston 28 pressurized with the help of spring element 56 in circumferential direction against converter cover 14. Spring element 56 is preferably made of sheet metal and is formed from a spring steel sheet. The exact design and function of coupling element 50 and spring element 56 are yet described in the following passage based on FIGS. 3 to 6.

In the embodiment depicted in FIG. 2, pins 58 are fixed on piston 28, with pins 58 engaged with depressions 59 cut out in converter cover 14 for torque transmission. In this embodiment, coupling element (50 in FIG. 1) is dispensed with. Piston 28 is braced in circumferential direction against converter cover 14, by means of spring element 60 that is fixed with the help of pins 58 on piston 28. For this purpose tongues are provided on spring element 60, with the tongues engaged with depressions 59 in converter cover 14 under the brace.

Figure 3:
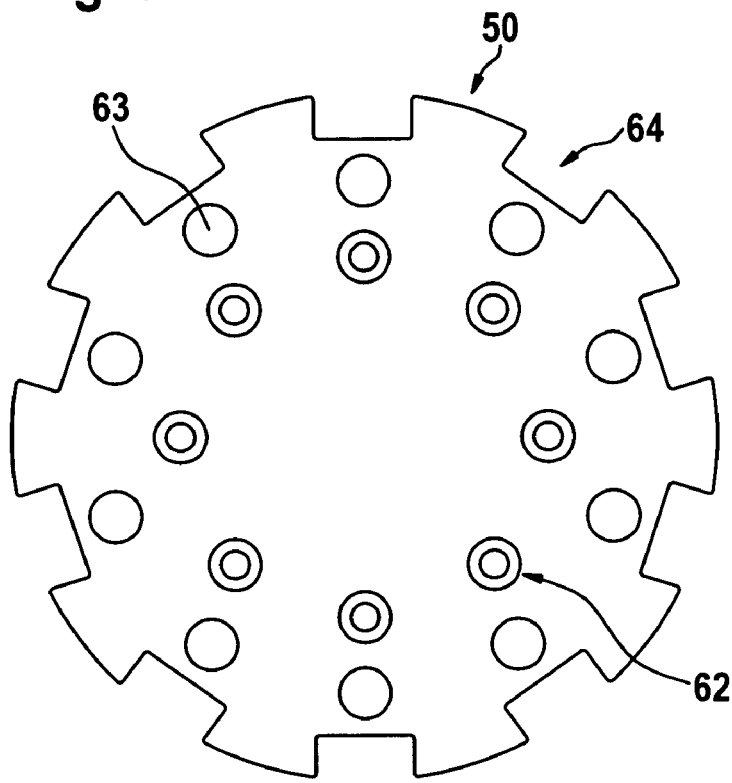
FIG. 3 shows a coupling element of the torque transmission device from FIG. 1 in plan view.

In FIG. 3, coupling element 50 from FIG. 1 is depicted alone in plan view. In the plan view, it is visible that coupling element 50 comprises eight holes 62 in total, in particular blind holes for riveting coupling element 50 to converter cover 14. Holes 62 are disposed on a circle uniformly distributed. Radially outside holes 62 are ten through holes 63 disposed for pins 54. (See FIG. 1). Through holes 63 are disposed on a further circle that is concentrically disposed to the circle on which holes 62 are disposed. Coupling element 50 features ten essentially rectangular cutouts 64 on the perimeter of coupling element 50. Cutouts 64 provide engagement possibilities for parts of the spring element 56 seen in FIG. 1.

Figure 4:
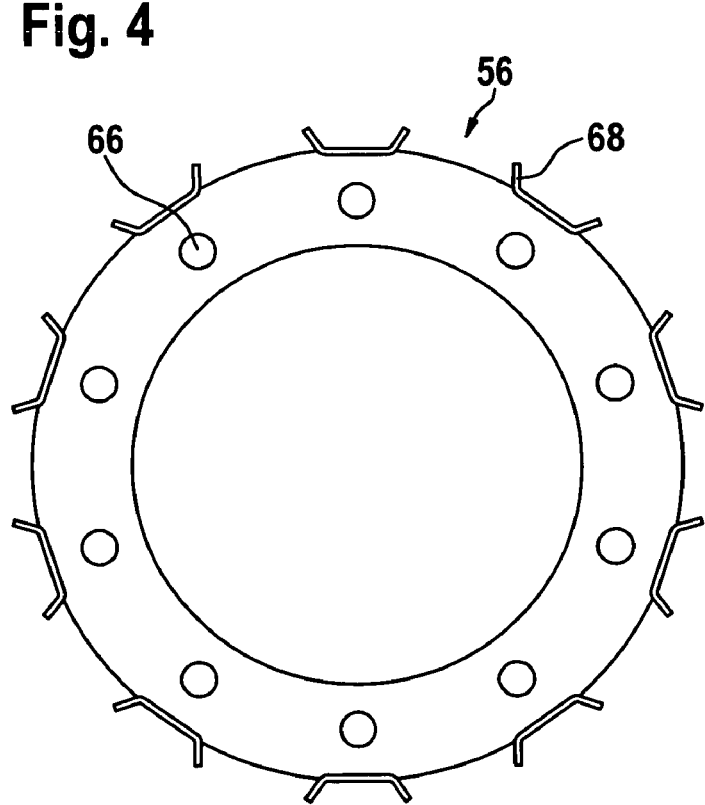
FIG. 4 shows a spring element of the torque transmission device from FIG. 1 in plan view.

In FIG. 4 spring element 56 from FIG. 1 is depicted alone in plan view. Spring element 56 has essentially the shape of a circular disk, which features ten holes 66 for riveting spring element 60 on piston 28 seen in FIG. 1. Spring element 56 features ten spring reeds 68, which are uniformly distributed over the circumference of spring element 56. Spring reeds 68 are thus adapted to the shape of corresponding cutouts 64, in that, in the assembled state, they engage with the corresponding cutouts 64 (FIG. 3) of coupling element 50 under the brace.

Figure 5:
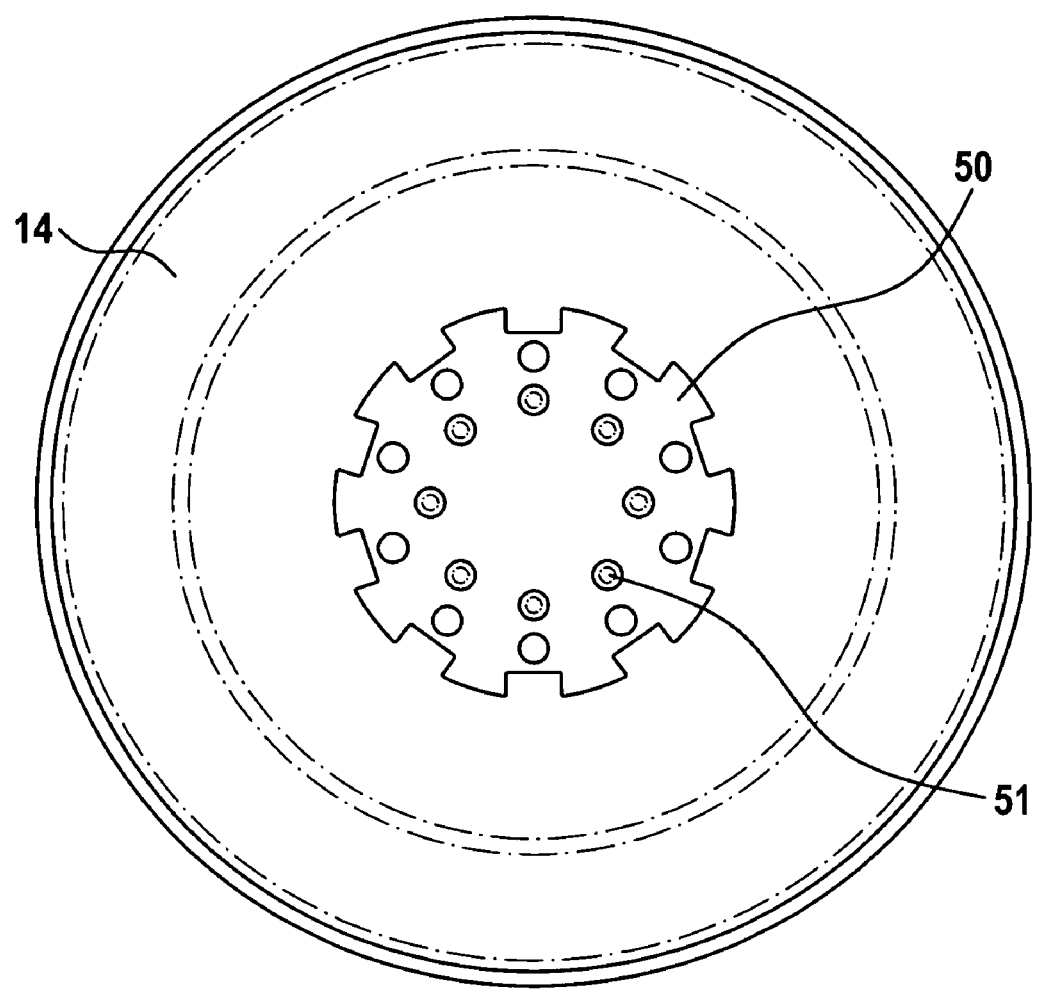
FIG. 5 shows the coupling element from FIG. 3, as it is fixed on a converter cover.

FIG. 5 is a front view depicting how coupling element 50 is fixed on converter cover 14 with the help of rivets 51. FIG. 6 is a rear view showing how spring element 56 is fixed on piston 28 with the help of the pins or rather clinch bolts 54.

The embodiments depicted in the Figures facilitate easy and cost-effective assembly or rather linking of piston 28 to converter cover 14 with piston 28 being preferably formed from piston sheet metal. Through the linkage according to the invention at least a part of the engine torque or rather drive torque is transmitted.

LIST OF REFERENCE SYMBOLS 1 torque transmission device
3 power train
5 transmission
6 torque converter
10 housing
12 axis of rotation
14 housing wall
15 pilot journal pin
21 turbine wheel
22 rivet fastening elements
24 hub
26 transmission input shaft
28 piston
36 torsional vibration damper
38 spring elements
39 input part
41 collar
43 connection disk
50 coupling element
51 rivet warts
54 pins
55 cutouts
56 spring element
58 pins
59 depressions
60 spring element
62 holes
63 through holes
64 cutouts
66 holes
68 spring reeds

I claim:

1. A torque transmission device in the power train of a motor vehicle with a hydrodynamic torque converter comprising:
a converter cover connectable to a drive unit, said converter cover coupled with a turbine wheel by an impeller;
a torque converter clutch including a piston, said piston axially displaceable relative to said converter cover; and, a plurality of piston pins fixedly attached to said piston, said piston pins extending in an axial direction and serving as a splined connection of said piston with said converter cover wherein the pins for splined connection of the piston with the converter cover engage directly with holes or depressions provided on the converter cover and are distributed circumferentially in a single ring around an axis of rotation.

2. The torque transmission device according to claim 1, wherein the pins for splined connection of the converter cover with the piston engage with holes provided in a coupling element that is fixed on the piston.

3. The torque transmission device according to claim 1, wherein the piston is braced against the converter cover by means of a spring element in the circumferential direction.

4. The torque transmission device according to claim 3, wherein the spring element engages with the holes with which also the pins engage.

5. The torque transmission device according to claim 3, wherein the spring element features driving tongues that engage with cutouts that are provided on a coupling element.

* * * * *